United States Patent
Weiss et al.

(10) Patent No.: US 7,404,392 B2
(45) Date of Patent: Jul. 29, 2008

(54) METHOD AND DEVICE FOR CONTROLLING AN INTERNAL COMBUSTION ENGINE

(75) Inventors: Frank Weiss, Pentling/Grasslfing (DE); Hong Zhang, Tegernheim (DE)

(73) Assignee: Siemens Aktiengesellschaft, Munich (DE)

( * ) Notice: Subject to any disclaimer, the term of this patent is extended or adjusted under 35 U.S.C. 154(b) by 309 days.

(21) Appl. No.: 10/573,170

(22) PCT Filed: Sep. 2, 2004

(86) PCT No.: PCT/EP2004/052016

§ 371 (c)(1),
(2), (4) Date: Mar. 23, 2006

(87) PCT Pub. No.: WO2005/031143

PCT Pub. Date: Apr. 7, 2005

(65) Prior Publication Data

US 2007/0051343 A1 Mar. 8, 2007

(30) Foreign Application Priority Data

Sep. 26, 2003 (DE) .................................. 103 44 759

(51) Int. Cl.
*F02D 41/06* (2006.01)
(52) U.S. Cl. ...................... 123/442; 123/683; 123/684; 701/105
(58) Field of Classification Search ................ 123/442, 123/683, 684; 701/105
See application file for complete search history.

(56) References Cited

U.S. PATENT DOCUMENTS

| 5,353,763 | A |   | 10/1994 | Schatz |
| 5,671,708 | A |   | 9/1997 | Ichinose et al. |
| 5,722,365 | A |   | 3/1998 | Sadakane et al. |
| 5,746,172 | A | * | 5/1998 | Peschka et al. .......... 123/559.1 |
| 5,823,163 | A |   | 10/1998 | Hoshi |
| 5,826,560 | A | * | 10/1998 | Ito .............................. 123/315 |
| 6,422,184 | B1 |  | 7/2002 | Kreuter |
| 6,571,765 | B2 | * | 6/2003 | Kuboshima et al. ......... 123/305 |
| 6,595,183 | B1 | * | 7/2003 | Olofsson .................. 123/559.2 |
| 7,320,300 | B2 | * | 1/2008 | Lewis et al. ............. 123/179.16 |

FOREIGN PATENT DOCUMENTS

| DE | 41 41 482 A1 | 6/1993 |
| DE | 197 54 287 A1 | 6/1999 |
| DE | 199 08 435 A1 | 9/2000 |
| DE | 102 00 533 A1 | 7/2003 |

* cited by examiner

Primary Examiner—Erick Solis

(57) ABSTRACT

The invention relates to an internal combustion engine which is provided with a manifold from which an intake tube extends to an intake of a cylinder of the internal combustion engine, with a gas inlet valve, disposed at the intake of the cylinder, an intermittent charge valve, disposed upstream of the gas inlet valve in the intake tube and releasing or closing the intake tube subject to a switching position of the intake tube, and in injection valve for metering fuel. The temporal position of the duration of injection of the fuel is adjusted subject to a point in time at which the switching position of the intermittent charge valve is changed. In this manner, it can be ensured that the air has a high velocity of flow during injection, thereby obtaining a good mixture preparation in a simple manner.

20 Claims, 4 Drawing Sheets

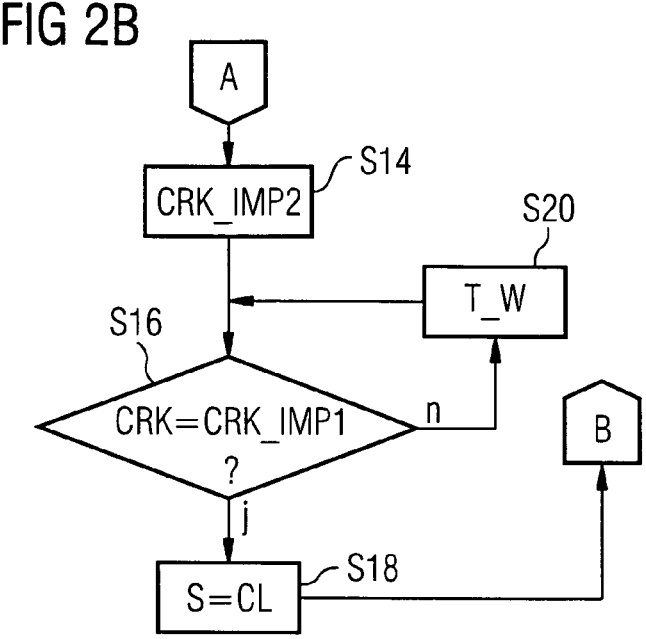
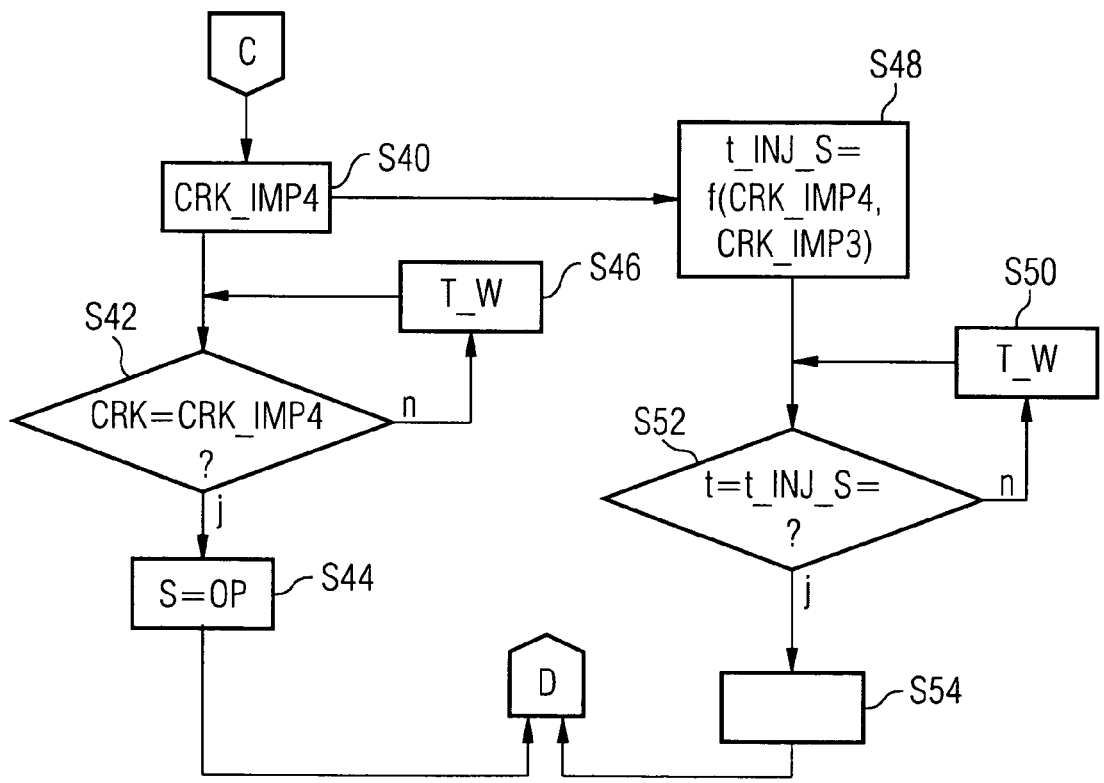

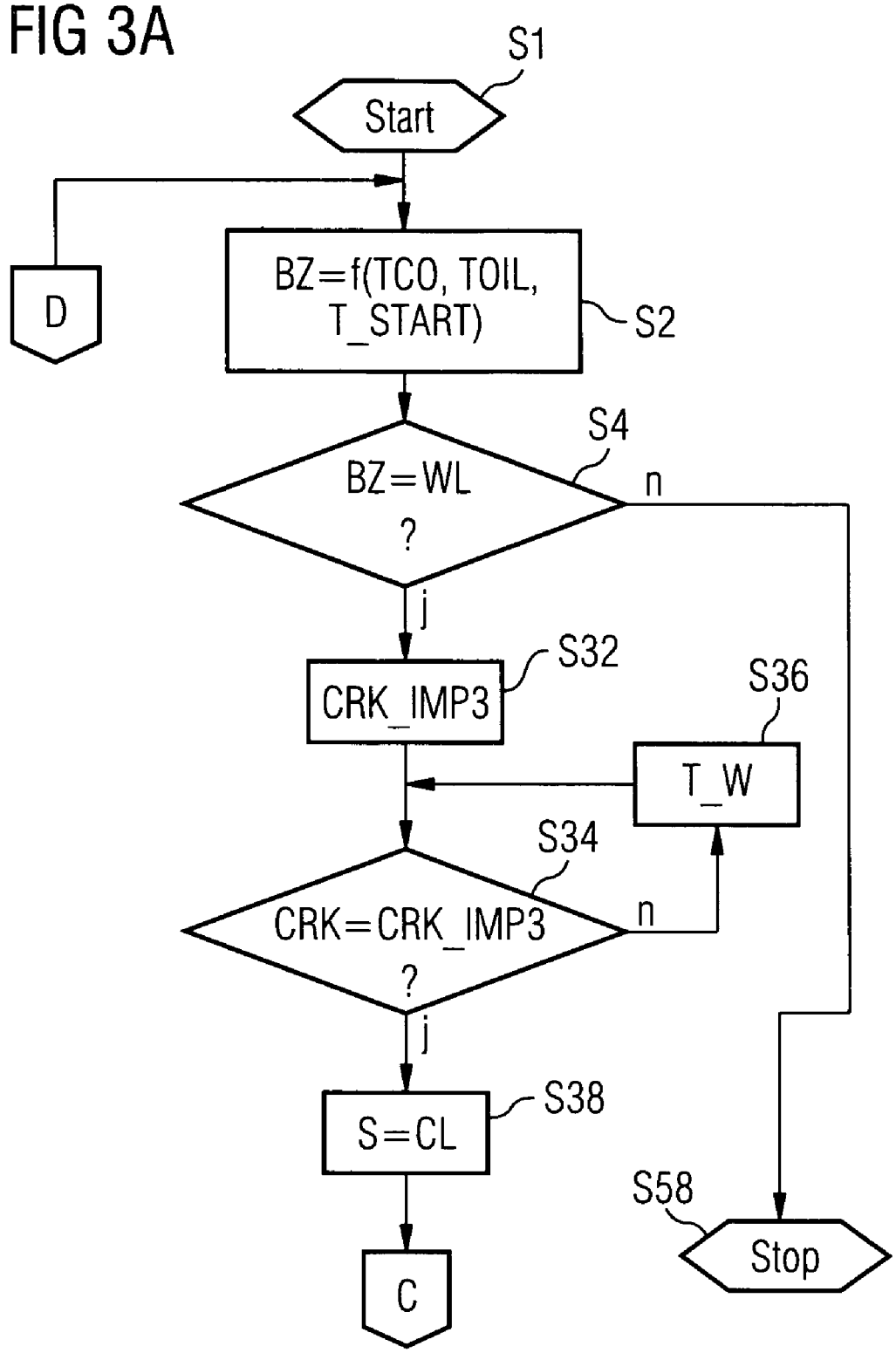

METHOD AND DEVICE FOR CONTROLLING AN INTERNAL COMBUSTION ENGINE

CROSS REFERENCE TO RELATED APPLICATIONS

This application is the US National Stage of International Application No. PCT/EP2004/052016, filed Sep. 2, 2004 and claims the benefit thereof. The International Application claims the benefits of German Patent application No. 10344759.8 filed Sep. 26, 2003. All of the applications are incorporated by reference herein in their entirety.

FIELD OF THE INVENTION

The invention relates to a method and device for controlling an internal combustion engine comprising an intermittent charge valve which is disposed in an intake tube.

BACKGROUND OF THE INVENTION

From DE 102 00 533 A1 a method and a device for controlling an internal combustion engine are known. The internal combustion engine has a manifold from which an intake tube extends to an intake of a cylinder of the internal combustion engine. A gas inlet valve is disposed at the intake of the cylinder. An intermittent charge valve is disposed upstream of the gas inlet valve in the intake tube. The intake tube is open or closed, depending on the switching position of the intermittent charge valve. Furthermore, an injection valve is provided which meters the fuel. The rapidly switching intermittent charge valves which are assigned to each cylinder are closed during the first section of the intake sequence so that a high negative pressure can build up. After approximately half of the intake sequence, the intermittent charge valve—the rapidly switching cross-sectional switch—is opened suddenly so that the negative pressure generated in the cylinder during the first section of the intake sequence generates a very high velocity of flow of the intake air/fuel mixture. The intake air column flowing very rapidly in to the combustion chamber of the cylinder of the internal combustion engine produces, in the range of low to moderate revolutions of the internal combustion engine, significant supercharging effects because of the better filling characteristics of the respective combustion chamber.

More stringent legal provisions with regard to the emissions, especially exhaust-gas emissions, of motor vehicles require that these be kept low if possible in all operating states of the internal combustion engine. Very high emissions are in principle generated in particular when the internal combustion engine is started up. This can be attributed to the fact that the internal combustion engine has not yet reached its operating temperature, and consequently fuel is deposited on the wall of the intake tube and/or the internal walls of the cylinders. The consequence of this is that a desired air/fuel ratio in the cylinder is optionally set defectively, which can lead to increased exhaust-gas emissions. In addition, the injected fuel vaporizes less well before the operating temperature is reached, which can also result in an impaired combustion process with increased waste-gas emissions, for example NOX, CO and CH emissions, as a consequence. This affects both internal combustion engines having injection valves which are disposed on the intake tubes and meter the fuel into the intake tubes and internal combustion engines in which the injection valves are disposed in the cylinder head and meter the fuel directly into the combustion chamber of the cylinder.

From U.S. Pat. Nos. 5,671,708 and 5,722,365 methods are known for controlling an internal combustion engine comprising an air-flow control valve which has a hole in its leaf and which thus enables an air flow through the intake tube even in its closed position. The air-flow control valve is closed during the entire start-up operation of the internal combustion engine, with the result that air is sucked into the cylinders of the internal combustion engine solely through the hole in the leaf.

SUMMARY OF THE INVENTION

An object of the invention is to establish a method and a device for controlling an internal combustion engine, by means of which pollutant emissions are reduced.

The object is achieved by the features of the claims. Advantageous embodiments of the invention are characterized in the subclaims.

The invention is distinguished by a method and a corresponding device for controlling an internal combustion engine comprising a manifold, from which an intake tube extends to an intake of a cylinder of the internal combustion engine, a gas inlet valve which is disposed at the intake of the cylinder, an intermittent charge valve which is disposed upstream of the gas inlet valve in the intake tube and which releases or closes the intake tube depending on its switching position, and an injection valve for metering fuel. The temporal position of the duration of injection of the fuel is adjusted depending on a point in time at which the switching position of the intermittent charge valve changes.

Coupling the temporal position of the duration of injection of the fuel to the point in time at which the switching position of the intermittent charge valve changes ensures that the air has a high velocity of flow during the metering of the fuel, and that a good preparation of the air/fuel mixture can thereby be achieved in a simple manner, as a result of which the emissions are reduced.

In an advantageous embodiment of the invention, the temporal position of the duration of injection is chosen such that the velocity of flow of the air reaches its maximum during the injection period. This has the advantage that a particularly good mixture preparation can be achieved.

In a further advantageous embodiment of the invention, the point in time at which the intermittent charge valve is guided to its open position during the intake stroke is chosen such that the velocity of flow of the air reaches a predetermined value. This has the advantage that the quality of the mixture preparation can be adjusted in a simple manner.

In a further advantageous embodiment of the invention, the point in time at which the intermittent charge valve is guided to its closed position from its open position during the intake stroke is chosen such that the velocity of flow of the air reaches a predetermined value in the subsequent intake stroke. This has the advantage that the quality of the mixture preparation can likewise be adjusted in a simple manner and that the metering of the fuel can commence very soon after the opening of the gas inlet valve.

In a further advantageous embodiment of the invention, the temporal position of the duration of injection of the fuel depends only in a warm-up operating state of the internal combustion engine on a point in time at which the switching position of the intermittent charge valve changes. This has the advantage that the fuel consumption of the internal combustion engine can thereby be kept low without having to accept a substantial increase in emissions, since a sufficiently good mixture preparation and fuel vaporization can as a rule be ensured outside the warm-up operating state and the intermittent charge valve then controlled outside the warm-up such that the internal combustion engine has a high degree of efficiency. The warm-up operating state is preferably characterized in that a coolant temperature and/or an oil temperature are less than predetermined threshold values and/or the time since the start-up of the internal combustion engine is less than a predetermined further threshold value.

BRIEF DESCRIPTION OF THE DRAWINGS

Exemplary embodiments of the invention are explained below with the aid of the schematic drawings, in which:

FIGS. 2a, 2b show a flow diagram of a first embodiment of a program for controlling the internal combustion engine, FIGS. 3a, 3b show a further flow diagram of a further embodiment of a program for controlling the internal combustion engine.

Elements of the same design and function are labeled with the same reference symbols in all the Figures.

DETAILED DESCRIPTION OF THE INVENTION

Figure 1:
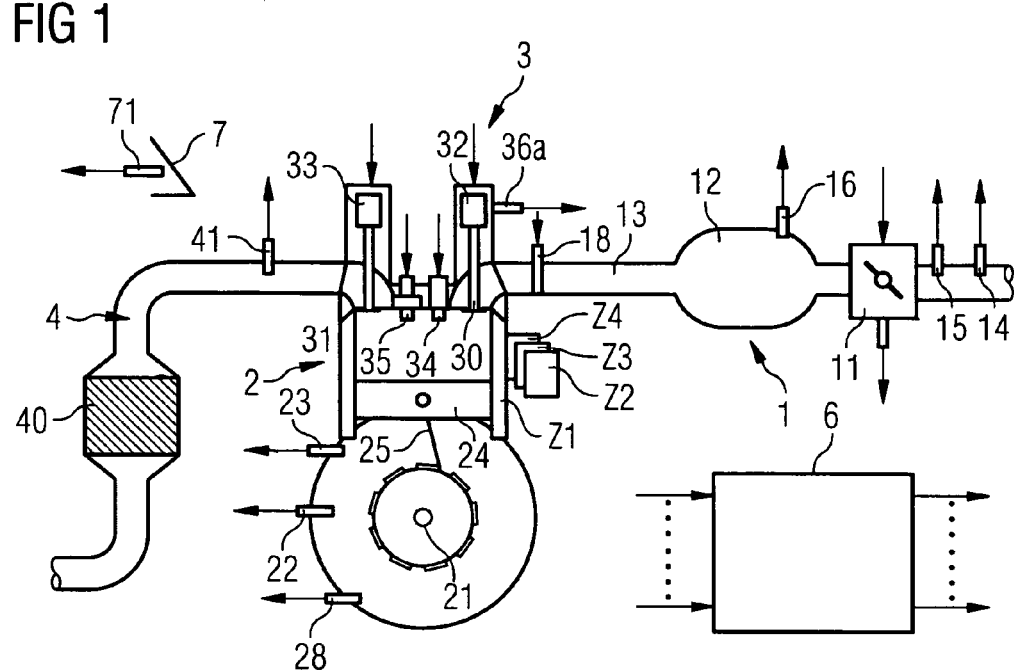
FIG. 1 shows an internal combustion engine comprising a control device.

An internal combustion engine (FIG. 1) comprises an intake section 1, an engine block 2, a cylinder head 3 and an exhaust section 4. The intake section preferably comprises a throttle valve 11, as well as a manifold 12 and an intake tube 13 which extends to a cylinder Z1 via an inlet channel into the engine block. The engine block comprises further a crankshaft 21 which is coupled via a connecting rod 25 to the piston 24 of the cylinder Z1.

The cylinder head 3 comprises a valve mechanism comprising an inlet valve 30, an outlet valve 31 and valve actuators 32, 33. The gas inlet valve 30 and the gas outlet valve 31 are actuated by means of a camshaft.

The cylinder head 3 comprises further an injection valve 34 and an ignition plug 35. Alternatively, the injection valve 34 can also be disposed in the intake channel.

The exhaust section 4 comprises a catalytic converter 40.

There is also disposed in the intake tube 13 an intermittent charge valve 18 which in one switching position S, the open position OP, releases the cross-section of the intake tube 13 and in a further switching positions, the closed position CL, closes the cross-section of the intake tube 13.

Furthermore, a control device 6 is provided, to which sensors are assigned which record different measurement variables and respectively determine the measured value of the measurement variable. The control device 6 determines, depending on at least one of the measurement variables, manipulated variables which are then converted into one or more actuating signals for controlling the final control elements by means of corresponding actuators.

The sensors are a pedal position sensor 71 which records the position of an accelerator pedal 7, an air-mass meter 14 which records an air mass flow upstream of the throttle valve 11, a temperature sensor 15 which records the temperature of the intake air, a pressure sensor 16 which records the pressure in the intake tube, a crankshaft angle sensor 22 which records a crankshaft angle CRK, a further temperature sensor 23 which records a coolant temperature TCO, yet another temperature sensor 28 which records an oil temperature TOIL, a camshaft angle sensor 36 which records the angle of the camshaft and an oxygen probe 41 which records a residual oxygen content of the exhaust gas. Depending on the embodiment of the invention, any subset of the designated sensors, or even additional sensors, can be present.

The control elements are, for example, the throttle valve 11, the gas inlet and gas outlet valves 30, 31, the injection valve 34, the ignition plug 35, the adjusting device 37 and the intermittent charge valve 18.

Besides the cylinder Z1, the internal combustion engine can also comprise further cylinders Z2-Z4, to which corresponding final control elements are then likewise assigned.

A program for controlling the internal combustion engine, which program is stored in the control device 6 is executed when the internal combustion engine is running. The program is started in a step S1 (FIG. 2a), in which variables are optionally initialized. The program start preferably takes place immediately after commencement of the engine start-up procedure.

In a step S2, the operating state BZ of the internal combustion engine is determined depending on the coolant temperature TCO and/or the oil temperature TOIL and/or the time since the period T_START since the start-up of the internal combustion engine.

A check is then carried out in step S4 as to whether the operating state BZ of the internal combustion engine is the warm-up operating state WL. If this is not the case, then the program is stopped in a step S30. If, on the other hand, the condition of step S4 is fulfilled, then in a step S6 a first crankshaft angle CRK_IMP1 is determined at which the intermittent charge valve 18 is guided from its closed position CL to its open position OP, while the gas inlet valve 30 releases the inlet.

The first crankshaft angle CRK_IMP1 is either predetermined as a fixed value in a simple embodiment or can depend on operating variables of the internal combustion engine. It is in any case chosen such that, after the switching position S of the intermittent charge valve 18 has changed from its closed position CL to its open position OP, the velocity of flow of the air reaches a predetermined value. This is preferably determined by means of trials with the internal combustion engine in advance on an engine test bed.

In a step S8, a check is carried out as to whether the current crankshaft angle CRK is equal to the first crankshaft angle CRK_IMP1. If this is not the case, the program remains for a predetermined waiting period T_W in a step S10 before the condition of step S8 is checked anew.

If, on the other hand, the condition of step S8 is fulfilled, then in a step S12 the intermittent charge valve 18 is guided to its open position OP. Then, in a step S14 a second crankshaft angle CRK_IMP2 is determined at which the intermittent charge valve is guided to its closed position CL again. The second crankshaft angle CRK_IMP2 can be predetermined as a fixed value or else depend on operating variables of the internal combustion engine.

In a step S16, a check is carried out as to whether the current crankshaft angle CRK is equal to the second crankshaft angle CRK_IMP2. If this is not the case, the program remains for the predetermined waiting period T_W in a step S20 before the condition of step S16 is checked anew.

If, on the other hand, the condition of step S16 is fulfilled, then in a step S18 the intermittent charge valve 18 is guided to its closed position CL. The processing is then continued anew, optionally after the waiting period T_W, in step S2.

Following the processing of step S6, the processing is continued, in parallel with steps S8 to S18, in a step S22, in which a time value is determined which is characteristic of the temporal position of the duration of injection of the fuel. Thus in the step S22, for example, the point in time t_INJ_S is determined at which the injection starts depending on the first crankshaft angle CRK_IMP1.

Alternatively, however, the end of the injection or any intermediate value can also be determined. The point in time t_INJ_S is preferably determined by means of characteristic curves or the interpolation of characteristics, and in such a way that the air then has a high velocity of flow during the injection, as a result of which a good mixture preparation can be achieved.

It is advantageous, particularly in internal combustion engines comprising injection valves which are disposed in the intake tubes 13, if the point in time t_INJ_S at which the injection starts is chosen such that the air has an adequate velocity of flow until the end of the injection and the entire metered quantity of fuel can thus also reach the cylinder of the internal combustion engine.

In addition, it is advantageous if the point in time t_INJ_S at which the injection is started is chosen such that the velocity of flow of the air reaches its maximum during the injection period. A very good mixture preparation is ensured thereby. This can be achieved in a particularly simple manner if the characteristic values are chosen correspondingly, which can be determined in a simple manner by means of trials with the internal combustion engine on an engine test bed.

A check is then carried out in a step S24 as to whether the current time t is equal to the point in time t_INJ_S at which the injection is started. If the condition of step S24 is not fulfilled, then it is rechecked anew, after expiry of the waiting period T_W, in step S26. If, on the other hand, the condition of step S24 is fulfilled, then in a step S28 the injection valve 34 is actuated for metering fuel. Processing is then continued anew, optionally after the predetermined waiting period T_W, in step S2.

An alternative embodiment of the program for controlling the internal combustion engine is shown with the aid of the flow diagram in FIGS. 3*a* and 3*b*. Following step S4, in this case a third crankshaft angle CRK_IMP3 is determined in step S32. The third crankshaft angle CRK_IMP3 is the crankshaft angle at which the intermittent charge valve 18 is guided from its open position to a closed position, while the gas inlet valve is in fact still open. As a result, a negative pressure is then generated in the area between the intermittent charge valve 18 and the gas inlet valve 30, which negative pressure is then stored until the intermittent charge valve 18 switches again from its closed position CL to the open position OP.

The third crankshaft angle CRK_IMP3 is either predetermined as a fixed value or is determined, depending on the operating variable of the internal combustion engine, by interpolation of the characteristics. It is predetermined in this case such that the velocity of flow of the air reaches a predetermined value in the subsequent intake stroke.

In a step S34, a check is carried out as to whether the current crankshaft angle CRK is equal to the third crankshaft angle CRK_IMP3. If this is not the case, then the program remains for the predetermined waiting period T_W in step S36, before the condition of step S34 is checked again. If, on the other hand, the condition of step S34 is fulfilled, then in a step S38, the intermittent charge valve 18 is guided to its closed position CL.

In a step S40, a fourth crankshaft angle CRK_IMP4 is determined. The fourth crankshaft angle CRK_IMP4 is either predetermined as a fixed value or depends on operating variables of the internal combustion engine. In a step S42, a check is carried out as to whether the current crankshaft angle CRK is equal to the fourth crankshaft angle CRK_IMP4. If this is not the case, then the program remains for the predetermined waiting period T_W in a step S46, before the condition of step S42 is checked again.

If, on the other hand, the condition of step S42 is fulfilled, then in a step S44, the intermittent charge valve 18 is guided to its open position OP. Processing is then continued, optionally after the predetermined waiting period T_W, in step S2.

Figure 2A:
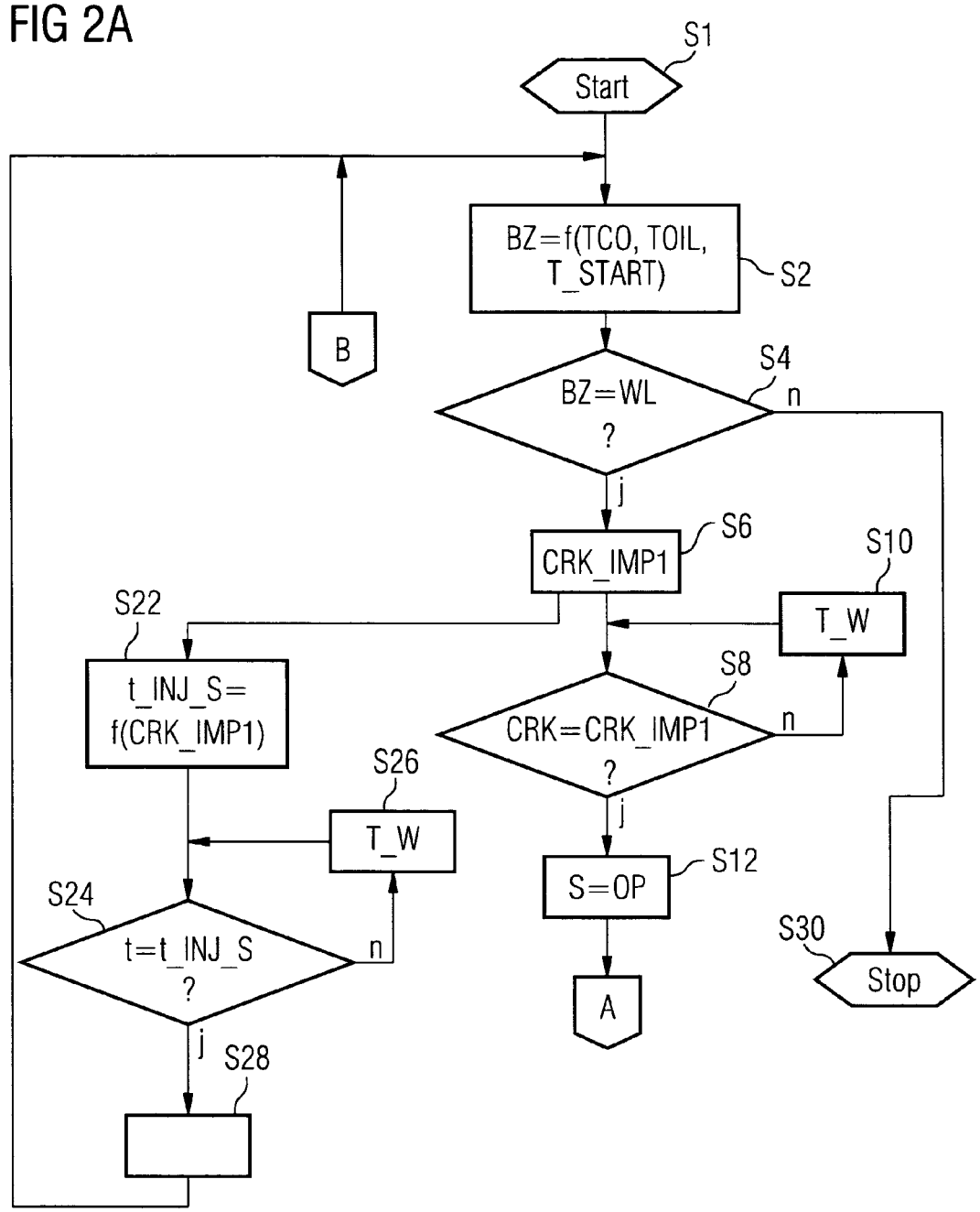

Following on from step S40, processing is, according to the embodiment shown in FIGS. 2*a* and *b*, continued in parallel with steps S42 to S46 in step S48 in which the point in time t_INJ_S of the start of injection is determined, depending in fact on the third and/or the fourth crankshaft angle CRK_IMP3, CRK_IMP4. This is carried out such that the air has a high velocity of inflow during injection.

The point in time t_INJ_S of the start of the injection is preferably chosen such that the velocity of flow of the air reaches its maximum during the injection period, as a result of which a particularly good mixture preparation can be achieved because of the high dynamic of the flow. As a result of a good preparation of the mixture, i.e. a fine spraying of the fuel drops and thus a very homogeneous air/fuel mixture, wall deposits or deposits of fuel on the internal walls of the cylinder Z1 are greatly reduced even during the warm-up, which leads to a more controlled flow of the combustion process and thus results in a reduction in the emissions of the internal combustion engine even when warming up.

In a step S52, a check is carried out as to whether the current time is equal to the point in time t_INJ_S at which the injection starts. If this is not the case, then the program remains for the predetermined waiting period T_W in step S50. If, on the other hand, the condition of step S52 is fulfilled, then in a step S54 the injection valve is actuated for fuel metering. The processing is then continued, optionally after the predetermined waiting period T_W, in step S2.

The crankshaft angle for guiding the intermittent charge valve to its open position OP or to its closed position CL can naturally also be expressed as a corresponding point in time. Similarly, the point in time t_INJ_S of the start of injection can be expressed in a corresponding crankshaft angle.

Figure 4:
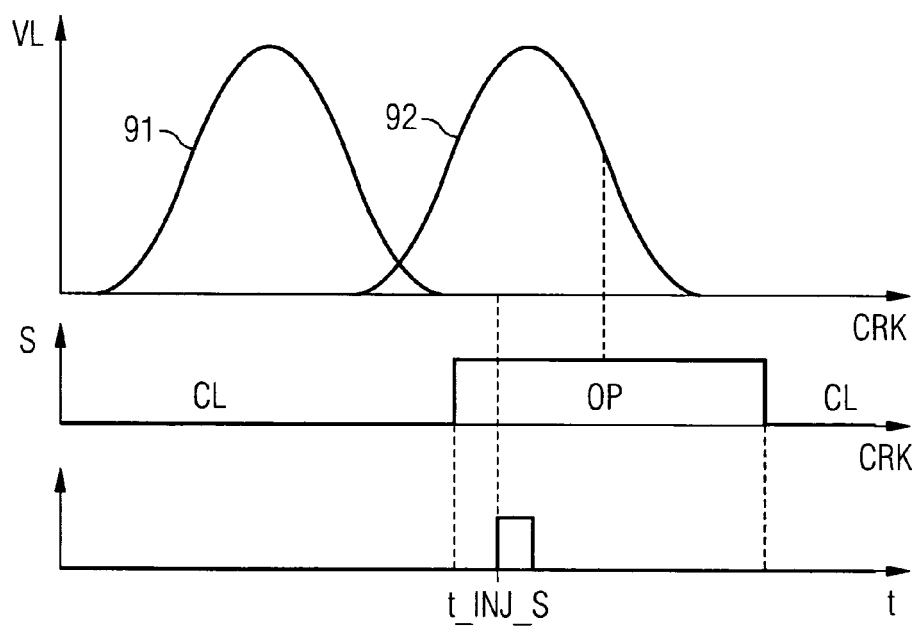
FIG. 4 shows curves of the valve stroke of the gas intake and gas outlet valves, of the switching position of an intermittent charge valve plotted over the crankshaft angle and the temporal curve of the metering of fuel.

In FIG. 4, by way of example, the curve of the valve stroke VL of the gas outlet valve 31, labeled with the reference symbol 91, and the curve of the valve stroke VL of the gas inlet valve 30, labeled with 92, are plotted over the crankshaft angle CRK. Furthermore, the switching position S of the intermittent charge valve 18 is plotted over the crankshaft angle. Furthermore, the actuation of the injection valve 34 is plotted over the time t corresponding to the crankshaft angle curve CRK. The start of the metering of fuel is labeled by means of the point in time t_INJ_S.

The invention claimed is:

1. A method for controlling an internal combustion engine, comprising:
   arranging an intermittent charge valve upstream of a gas inlet valve in an intake tube of the engine that opens or closes the intake tube;
   switching an intermittent charge valve depending on a switching position; and
   adjusting a temporal position of a fuel injection duration depending on a point in time where a switching position of the intermittent charge valve is changed.

2. The method according to claim 1, wherein the temporal position of the fuel injection duration is selected such that an air flow velocity reaches a maximum flow velocity during the injection period.

3. The method according to claim 1, wherein the point of time at which the intermittent charge valve is switched to the open position is selected such that an air flow velocity reaches a predetermined value.

4. The method according to claim 1, wherein the point of time at which the intermittent charge valve is switched to the closed position from an open position is selected such that an air flow velocity reaches a predetermined value.

5. The method according to claim 4, wherein the intermittent charge valve is switched during an intake stroke.

6. The method according to claim 1, wherein the temporal position of the fuel injection duration is adjusted only during a warm-up operation state of the internal combustion engine, the adjustment depending on a point in time at which the switching position of the intermittent charge valve is changed.

7. The method according to claim 6, wherein the intermittent charge valve is switched during an intake stroke.

8. The method according to claim 6, wherein the warm-up operating state occurs when a coolant temperature and an oil temperature are less than predetermined threshold values and the time since the start-up of the internal combustion engine is less than a predetermined further threshold value.

9. The method according to claim 6, wherein the warm-up operating state occurs when a coolant temperature or an oil temperature are less than predetermined threshold values and the time since the start-up of the internal combustion engine is less than a predetermined further threshold value.

10. The method according to claim 6, wherein the warm-up operating state occurs when a coolant temperature and an oil temperature are less than predetermined threshold values or the time since the start-up of the internal combustion engine is less than a predetermined further threshold value.

11. The method according to claim 6, wherein the warm-up operating state occurs when a coolant temperature or an oil temperature are less than predetermined threshold values or the time since the start-up of the internal combustion engine is less than a predetermined further threshold value.

12. An internal combustion engine control device, comprising:
   an intake manifold;
   an intake tube that connects an intake of a cylinder of the internal combustion engine to the manifold;
   a gas inlet valve disposed at the intake of the cylinder;
   an intermittent charge valve disposed upstream of the gas inlet and which opens or closes the intake tube depending on a switching position;
   an injection valve for metering fuel; and
   an adjustment device that adjusts a temporal position of a fuel injection duration depending on when the switching position is changed.

13. An internal combustion engine, comprising:
   an engine block containing a crankshaft and a cylinder;
   a cylinder head arranged on the engine block opposite the crankshaft to form an end of the cylinder;
   a piston arranged within the cylinder;
   a connecting rod that connects the piston to the crankshaft;
   an induction pipe connected to the cylinder head via an induction gas valve;
   a manifold from which an intake tube extends to an intake of a cylinder of the engine;
   an intermittent charge valve disposed upstream of the gas inlet valve in the intake tube and which selectively opens or closes the intake tube depending on a switching position;
   an injection valve for metering fuel; and
   an adjustment device that adjust the temporal position of the duration of injection of the fuel depending on a point in time at which the switching position of the intermittent charge valve is changed.

14. The engine according to claim 13, wherein the temporal position of the fuel injection duration is selected such that an air flow velocity reaches a maximum flow velocity during the injection period.

15. The engine according to claim 13, wherein the point of time at which the intermittent charge valve is switched to the open position is selected such that an air flow velocity reaches a predetermined value.

16. The engine according to claim 13, wherein the point of time at which the intermittent charge valve is switched to the closed position from an open position is selected such that an air flow velocity reaches a predetermined value.

17. The engine according to claim 13, wherein the temporal position of the fuel injection duration is adjusted only during a warm-up operation state of the internal combustion engine, the adjustment depending on a point in time at which the switching position of the intermittent charge valve is changed.

18. The engine according to claim 17, wherein the warm-up operating state occurs when a coolant temperature and an oil temperature are less than predetermined threshold values and the time since the start-up of the internal combustion engine is less than a predetermined further threshold value.

19. The engine according to claim 17, wherein the warm-up operating state occurs when a coolant temperature or an oil temperature are less than predetermined threshold values and the time since the start-up of the internal combustion engine is less than a predetermined further threshold value.

20. The method according to claim 17, wherein the warm-up operating state occurs when a coolant temperature or an oil temperature are less than predetermined threshold values or the time since the start-up of the internal combustion engine is less than a predetermined further threshold value.

* * * * *